March 14, 1933. E. A. CORBIN, JR 1,901,023
SINGLE DECK BUS WITH SUPERIMPOSED SEATS
Original Filed Oct. 15, 1927   3 Sheets-Sheet 1

INVENTOR
Elbert A. Corbin Jr.
by
Herbert S. Fairbanks
ATTORNEY

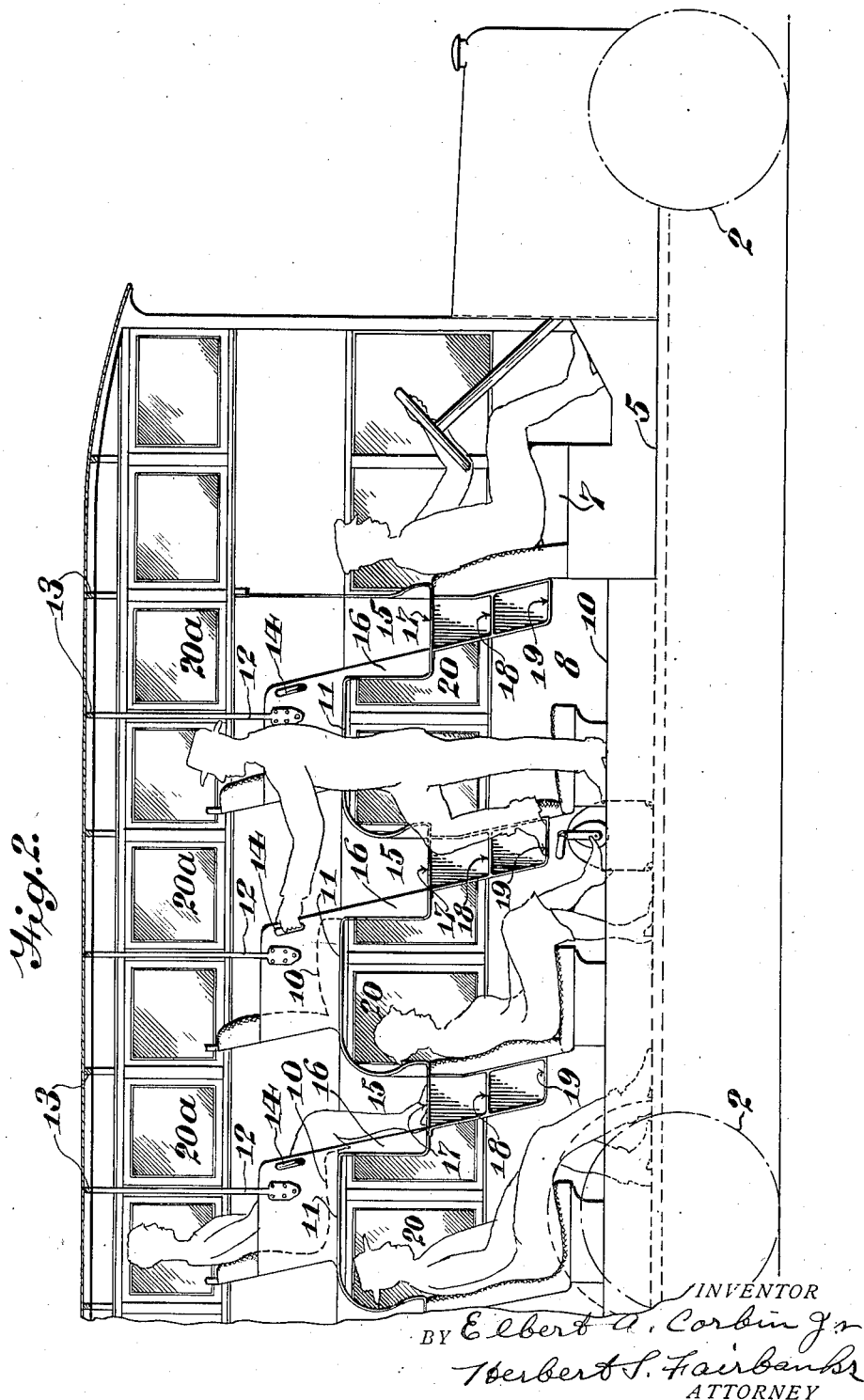

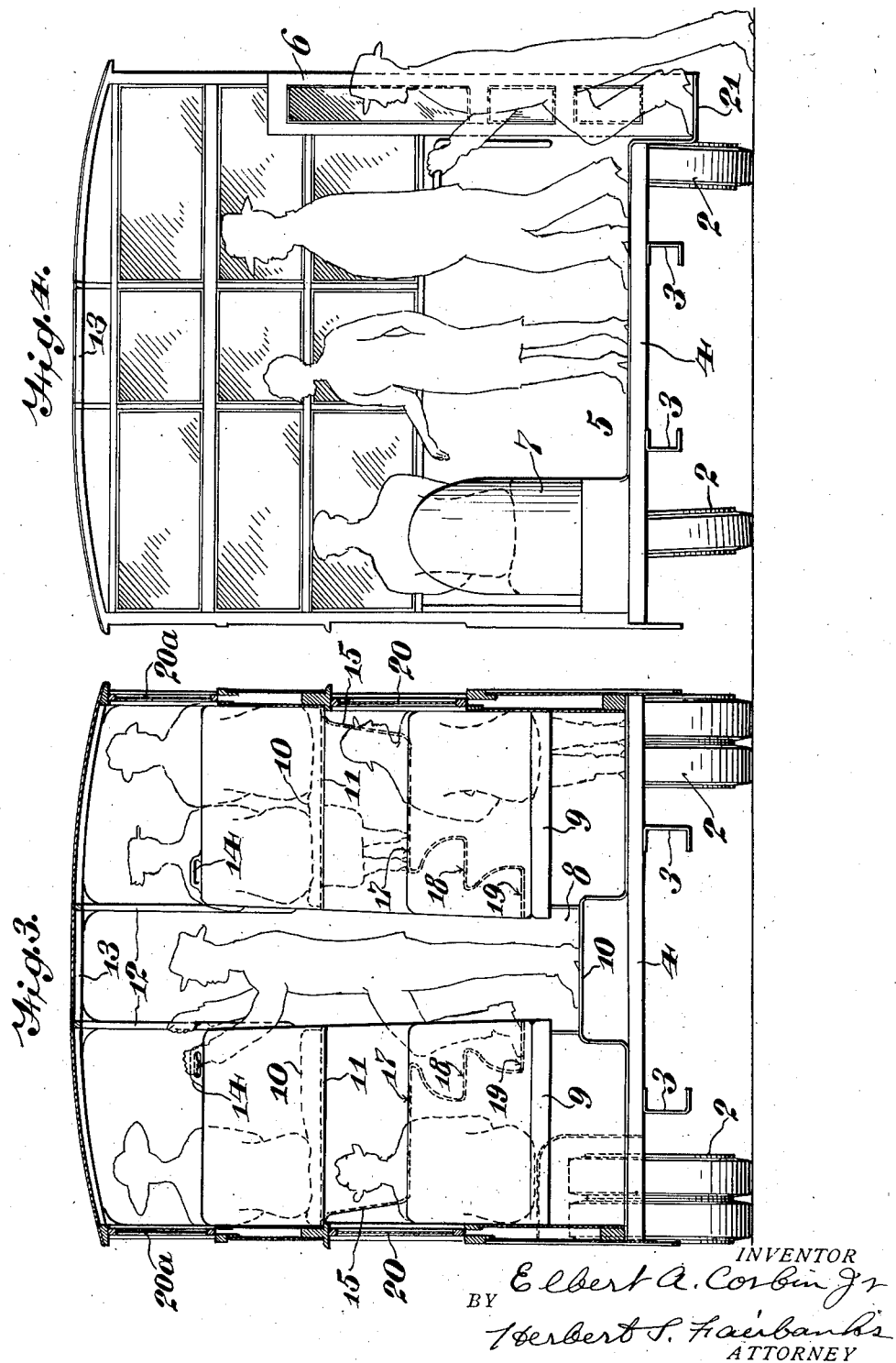

Patented Mar. 14, 1933

1,901,023

UNITED STATES PATENT OFFICE

ELBERT A. CORBIN, JR., OF GRADYVILLE, PENNSYLVANIA, ASSIGNOR OF ONE-HALF TO WILLIAM A. BROWN, OF PHILADELPHIA, PENNSYLVANIA

SINGLE DECK BUS WITH SUPERIMPOSED SEATS

Application filed October 15, 1927, Serial No. 226,298. Renewed July 29, 1932.

A double deck bus has nearly double the passenger carrying capacity of a single deck bus with a corresponding increase in bus earnings but its use is restrictive because of its excessive height and instability. Automotive transportation companies have therefore felt themselves compelled to operate less profitable single deck buses with their more limited passenger carrying capacity over routes which warrant the operation of a higher capacity of the double deck type but which is impracticable owing to its excess height and instability.

Many attempts have been made to lower the height of double deck buses in an effort to widen their usefulness but thus far very little progress has been made in this direction. Even those buses equipped with the make-shift semi-enclosed top, which is useless in inclement weather because of its open aisle, have a height of twelve feet eight inches. The more modern examples of a double decked bus having a fully enclosed top, have a height of thirteen feet five inches.

It will be readily understood that a vehicle about thirteen feet high presents various problems in its operation due to street obstructions such as bridges, overhead wires, and the like that are not present in the operation of a lower vehicle, and it is the particular object of this invention to provide an automotive passenger bus having the operating advantages of the lower single deck bus and closely approximating the greater passenger capacity of the double deck bus, and a further object is to embody in a bus of this type the desirable and advantageous features of both the single and double deck types eliminating features of construction that have proved objectionable to bus transportation companies.

In my present construction, the height of the vehicle closely approaches that of the best example of the single deck urban bus, but has in addition a passenger carrying capacity equalling that of the ordinary double deck bus, thus enabling its use on all roadways with absolute safety and increased profit.

The semi-enclosed double deck bus referred to as being twelve feet eight inches high merely enshrouds the seated passengers, and a person five feet ten inches in height on standing in the open aisle would protrude nineteen inches above the top of the bus making the danger height of the vehicle fourteen feet three inches in passing under obstructions, or sufficient in most instances to cause decapitation of a passenger standing on the upper deck if struck when the vehicle is moving with any speed whatever, and requiring the stationing of someone on this upper deck to warn the passengers not to stand up in passing under any low obstacle.

By my novel construction, I am able to reduce this overall danger height to ten feet or a reduction in danger height below the best example of a double deck bus in existence today of four feet five inches. In lowering the height of the vehicle, I also lower its center of gravity, making the vehicle more stable and entirely removing the psychological effect the usual double deck bus, because of its great height, has on timid individuals.

In my novel construction with its superimposed seating arrangement, I eliminate the stair of many steps used in gaining access to the upper deck of the double deck bus and I also eliminate the terrifying experience most nervous people pass through in negotiating this constricted steep flight of steps.

Another objection to the double deck bus is the inadequate ventilation of the lower deck and a lack of head room and foot room on both the upper and lower decks, a condition which has resulted from the efforts that have been made to reduce the size of these vehicles at the expense of the comfort of the passengers and reaching a point where it has become a geometric impossibility to further reduce the space occupied by the passenger.

In the double deck type of bus with the fully enclosed top having overall height under fourteen feet, head room in the aisles has been reduced to such an extent that a person of even average height has to walk with head and body bent over to avoid hitting the roof, or, in other words, the type of bus with the fully enclosed top has in addition to the uncomfortably constricted head and foot room, while seated, of the semi-enclosed bus, a worse condition, namely, that of insufficient head room in the aisles, of the vehicle. In my novel superimposed seating arrangement in a single deck type of body, I am able to allow enough height in my aisle to permit persons above the average height to stand or walk erect without bending.

By having both my upper and lower tiers of seats under one roof in a super-imposed relation to each other, I am able to secure perfect ventilation of the vehicle since air and sunshine from both top and bottom windows cooperate in making my lower tier seats pleasant, while my upper tier seats enjoy a perfect location for an abundance of air and sunshine.

By my novel construction, I am also enabled to provide ample head and leg room for all seated passengers as will be evident from the accompanying drawings. The leg pockets are so constructed that the occupants of the upper seats have ample leg room and the height from the seat to the roof give ample head room for a seated person. The seating arrangement of the lower seats on the deck is also such that a lower seat provides ample leg room for the occupant in rear of such seat. Ample head room is also provided between the upper seat and the lower seat so that the occupants can have the same comfort they would have in an automobile of the pleasure type.

With the above and other objects in view as will hereinafter more clearly appear, my invention comprehends a novel construction and arrangement of a single deck bus having super-imposed seats.

It further comprehends a novel construction and arrangement of a bus wherein a single deck is employed having a loading platform which communicates with a longitudinally extending aisle communicating with the upper and lower seats constructed and arranged in a novel manner so that the upper seats are accessible to the passengers by a minimum number of steps leading to each seat of the upper tier seats, and a novel construction of leg pockets.

It further comprehends a novel construction and arrangement of a bus body adapted for one man operation and having one or more doors controllable by the driver to control the ingress and egress of passengers, a novel construction and arrangement of seats and means affording communication to such seats, and a novel arrangement of windows.

Other novel features of construction and arrangement will hereinafter more clearly appear in the detailed description and the appended claims.

For the purpose of illustrating the invention I have shown in the accompanying drawings a typical embodiment of it, which, in practice, will give reliable and satisfactory results. It is, however, to be understood that this embodiment is typical only, and that the various instrumentalities of which my invention consists can be variously arranged and organized, and the invention is not, therefore, limited to the precise arrangement and organization of these instrumentalities as herein set forth.

Figure 2 is a longitudinal section of the bus showing more clearly the seating arrangement.

Figure 3 is a transverse section taken in the rear of super-imposed seats.

Figure 4 is a transverse section showing more particularly the loading platform, the location of the driver's seat, and the doors controlling entrance to and exit from the bus.

Similar numerals of reference indicate corresponding parts.

Referring to the drawings:—

Figure 1:
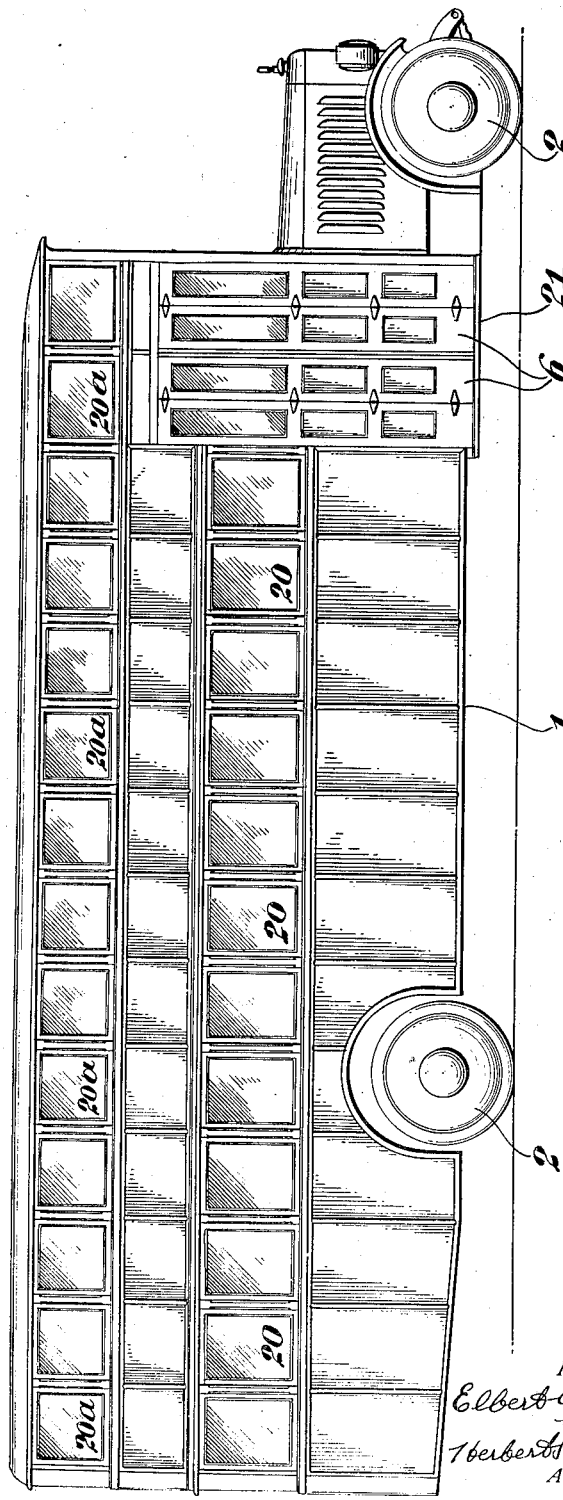
Figure 1 is a side elevation of a single deck motor vehicle bus embodying my invention.

1 designates a bus embodying my invention, which is provided with any desired type of running gear, and I have deemed it necessary in the present instance to show only the wheels 2.

The body is carried on the girders 3 or their equivalent which support the lower deck 4, which at the front of the bus is provided with the loading platform 5, entrance to which and exit from which is controlled by the doors 6 of any desired or conventional construction, which are controlled by the driver of the bus. At one side of the loading platform 5, and as illustrated at the left hand side, is located the driver's seat 7.

A longitudinally extending aisle 8 communicates with the loading platform 5 and extends to the rear of the vehicle in order to give access to the seating arrangement. It will be noted that this aisle, as shown more clearly in Figure 3, is raised above the lower deck 4. The lower seats 9 are disposed alongside of the aisle, and, as illustrated, on each side of the aisle, these seats are secured at their outboard end to the side of the body in any desired manner, and at their inboard ends they are supported on the tread member 10 of the aisle in any desired manner.

Super-imposed above the lower seats 9 are the upper seats 11 which are supported in any desired manner, and, as illustrated, at the outboard side they are connected with the side of the body, and they have connected with them the bars 12 at the inboard side, said bars being also connected with the carlines 13. These bars 12 form grasping handles and the upper seats are also each provided with a grasping handle 14. Each upper seat 11 is provided with a leg pocket 15, which is provided with an apron 16 at the side which serves as a guard or a shroud to render invisible the limbs of the passengers occupying the upper seats. Three steps, 17, 18 and 19, provide access from the aisle 8 to each upper seat.

The side of the body of the bus is provided with the lower windows 20 and with the upper windows 20a, which are so arranged that the occupants of both the upper and lower seats have an unrestricted view through an individual window. The bus is provided with a step 21 permitting entrance to the loading platform 5, and it will be seen that in order to occupy the lower seats 9, the patron of the bus steps down one step from the aisle 10, although, as is apparent, the tread member 10 of the aisle may be flush with the deck 4 of the bus or formed thereby, in which case there would be an additional step for a passenger to take to reach an upper seat.

The ease and simplicity of operating my novel bus construction will be evident from the following description of the manner of entering or leaving the bus and the seating of the passenger in either the lower or upper tier of seats.

The passenger after entering the vehicle steps up one step from the loading platform, and in using the lower tier of seats, steps down one step again and seats himself. If the lower tier seats are full, or, if he chooses to use an upper tier seat, he has to step up three steps which enable him to reach the upper tiers in searching for a seat. The height of each of these three steps need never be over eleven inches which is an easy height for a person to negotiate. There is a small apron at the sides of the upper tier seats which acts as a guard or shroud to protect the limbs of the passengers from the gazes of the patrons in the lower tier seats. It will be seen from the layout in the accompanying drawings of both the upper and lower tier seats, that my construction is very comfortable as to leg room and head height, either sitting or standing.

The leg pockets of the upper tier seats are rounded to give a full visibility of a sash width to persons seated in the lower seats. The space formed by this upper tier leg pocket is of great value as it brings the cards of advertisement within a normal reading distance (seventeen inches) and are sure to command the attention of the passenger as it is so near his eye. The space between the carlines of the roof can be used for advertisement cards so that the lower advertisement spaces are a desirable and profitable gain in space.

My novel construction is distinctly a one man operation job which is a feature striven for by all designers of transportation vehicles. The double doors which allow ingress and egress simultaneously are easily controlled by the driver. The usual safety door will be stationed at the rear end of the center aisle and can be used in case of accident or at terminal ends of the trip for egress and ingress.

Two narrow sashes are used in every bay of the bus in place of one wide sash as they are easier of operation and glass breakage is reduced, and they also permit of the use of many additional upright supports which add strength to the construction. The three steps necessary to be taken by the passenger in reaching the upper tier seats in my novel construction, are well within the bus, and, augmented by the hand grips, make the ascent much easier than the nine steps required to reach the upper deck on the unstable rear vibrating platform of the regular double deck bus.

In so far as I am aware, I am the first in the art to devise a single deck bus having substantially the same overall height of the conventional single deck bus but provided with a seating arrangement wherein the seats are super-imposed, and, also, wherein each of the upper seats is in direct communication with a longitudinally extending aisle, and it is to be understood that my claims to such features are to receive the generic interpretation to which a pioneer in the art is entitled.

It will be understood that while I have illustrated and described the invention herein disclosed in detail as involving a bus, it will be apparent the seating arrangement herein disclosed is adapted to be employed in conjunction with any type of a vehicle employed for transporting passengers, such as for example, trolley cars, trains, trams, boats, launches, aeroplanes and dirigibles, irrespective of whether the vehicle travels on land, water, or in the air, and it is therefore to be understood that I do not desire this application to be limited to the use of this seating arrangement for rubber tire vehicles as it is immaterial whether the vehicle travels on land, water or in the air.

It will now be apparent that I have devised a new and useful single deck bus with super-imposed seats which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention what I claim as new and desire to secure by Letters Patent, is:—

1. An enclosed passenger seating compartment for vehicles having a roof and a single deck between its support and the roof, and a longitudinally extending aisle, superimposed seats tranversely disposed along said aisle, the lower seats being positioned below the upper seats but out of vertical alignment therewith, the upper of said seats having leg pockets extending to the tops of the backs of the lower seats.

2. An enclosed passenger compartment for vehicles having a roof and a single deck between its support and the roof, and a longitudinally extending aisle, and superimposed seats transversely disposed along said aisle, the upper of said seats each having individual leg pockets, said leg pockets having steps leading from said aisle to the upper seats.

3. An enclosed passenger seating compartment for vehicles having a roof and a floor forming a single deck between the compartment support and the roof, a longitudinally extending aisle raised above said floor, and superimposed seats in said compartment, each of the upper of said seats being provided with individual leg pockets communicating with said aisle and positioned between juxtaposed lower seats.

4. An enclosed passenger seating compartment for vehicles, having a closed roof and a single deck between the compartment support and the roof, and having an aisle extending longitudinally of said deck, lower seats transversely disposed on said deck, upper seats transversely disposed above said lower seats, leg pockets for the upper seats, and steps within the planes of the leg pockets affording communication between said aisle and leg pockets.

5. An enclosed passenger seating compartment for vehicles, having a closed roof and a single deck between the compartment support and the roof, and having an aisle extending longitudinally of said deck, lower seats transversely disposed on said deck, upper seats transversely disposed above said lower seats, leg pockets for the upper seats, steps affording communication between said aisle and leg pockets, and aprons on the aisle ends of said leg pockets.

6. A passenger seating compartment for vehicles having a single deck above its support and forming a floor and provided with a longitudinally extending aisle, superimposed seats transversely disposed along the aisle, above said single deck, and steps between juxtaposed lower seats and inwardly of the aisle and leading to the upper of said seats.

7. An enclosed passenger seating compartment for vehicles having a roof and a single deck between the compartment support and its roof, said single deck forming at one end a loading platform and provided with a longitudinally extending aisle, superimposed seats transversely disposed along said aisle above said deck, the upper of said seats having leg pockets, individual steps affording communication between said aisle and said leg pockets, and grasping handles connected with said seats and adapted to be grasped by a person going up or down said steps.

8. An enclosed passenger seating compartment for vehicles having an enclosed roof and a single deck between the compartment support and said roof, said deck forming at one end a loading platform communicating with a longitudinally extending aisle carried by the lower deck, superimposed seats transversely disposed along said aisle above said deck, each of the upper of said seats having a leg pocket, having a downwardly extending rear wall and a front wall secured to the juxtaposed upper seat, and extending below the heads of passengers seated on the lower seats, individual steps carried by the said leg pockets affording communication between said aisle and said leg pockets, and grasping means for a person going up and down said steps.

ELBERT A. CORBIN, Jr.